US008009164B2

(12) United States Patent
Sendhoff et al.

(10) Patent No.: US 8,009,164 B2
(45) Date of Patent: Aug. 30, 2011

(54) FREE STYLE DEFORMATION

(75) Inventors: Bernhard Sendhoff, Bruchkobel (DE);
Markus Olhofer, Seligenstadt (DE);
Stefan Menzel, Dreieich-Sprendlingen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 888 days.

(21) Appl. No.: 11/853,289

(22) Filed: Sep. 11, 2007

(65) Prior Publication Data

US 2008/0068373 A1    Mar. 20, 2008

(30) Foreign Application Priority Data

Sep. 15, 2006   (EP) ..................................... 06019396

(51) Int. Cl.
*G06T 15/00* (2006.01)
(52) U.S. Cl. ........ 345/419; 345/420; 345/423; 345/424; 345/442; 345/473; 382/276; 703/1; 703/2
(58) Field of Classification Search .................. 345/418, 345/419, 420, 423, 424, 442, 473; 703/1, 703/2; 382/276
See application file for complete search history.

(56) References Cited

U.S. PATENT DOCUMENTS

| | | | | |
|---|---|---|---|---|
| 6,236,403 | B1 * | 5/2001 | Chaki et al. | 345/420 |
| 7,576,738 | B2 * | 8/2009 | Litke et al. | 345/420 |
| 7,583,853 | B2 * | 9/2009 | Taylor et al. | 382/276 |
| 2006/0262112 | A1 * | 11/2006 | Shimada | 345/419 |
| 2008/0020362 | A1 * | 1/2008 | Cotin et al. | 434/267 |

OTHER PUBLICATIONS

Annicchiarico "Structural shape optimization 3D finite-element models based on generate algorithms and geometric modeling". Published 2001.*
European Search Report, European Application No. 06019396, Jul. 3, 2007, 4 pages.
Van Den Berg, E. et al., "Freeform Feature Modelling: Concepts and Prospects," Computers in Industry, Elsevier Science Publishers, Amsterdam, NL, Oct. 2002, pp. 217-233, vol. 49, No. 2.
Yamada, R. et al., "A Method of KANSEI Acquisition to 3D Shape Design and Its Application," 8$^{th}$ IEEE International Workshop on Robot and Human Interaction, RO-MAN '99, Sep. 27-29, 1999, pp. 369-374.

* cited by examiner

*Primary Examiner* — Kimbinh T Nguyen
(74) *Attorney, Agent, or Firm* — Fenwick & West LLP (57) ABSTRACT

A method for modifying an object design using a computer comprises the steps of: selecting a first sub-design of the object design comprising a first free form deformation geometry and a first free deformation control volume that is variable and adaptive; choosing a second sub-design comprising a second free form deformation geometry; and replacing the first geometry with the second geometry.

10 Claims, 11 Drawing Sheets

FREE STYLE DEFORMATION

FIELD OF THE INVENTION

The present invention relates to the deformation of objects using an extension of free form deformation (FFD) that can be applied to computer graphics or to optimize real-world designs.

BACKGROUND OF THE INVENTION

Free Form Deformation (FFD) techniques have been introduced to manipulate objects in computer graphics and computer animations. The FFD has been applied to optimize shapes of aerodynamic objects in conjunction with evolutionary algorithms. The FFD techniques is known to provide a reasonable compromise in the flexibility of shapes and a small number of parameters, which in turn results in a small dimensional search space for the optimization. Furthermore, it has been demonstrated that the shape deformations defined by the FFD techniques can be applied equally well to deform a grid for computational fluid dynamics calculations. Using the FFD techniques, it is possible to obviate generating of the manual grid even for complex geometries. In many cases, design optimization of complex shapes becomes feasible only when the FFD techniques are used for the representation. In the FFD techniques, deformations of an initial design are described instead of the geometry itself. Therefore, the number of parameters is independent of the complexity of the shape and is determined solely by the required flexibility of the deformation.

An FFD system is generally defined by a lattice of control points. A modification in the positions of the control point results in a deformation of the geometry inside the control volume. For optimization, it is important to minimize the number of parameters. The reduction in the number of parameters is achieved by properly initializing the control volume because the number and position of control points determine the flexibility of the shape.

Figure 1:
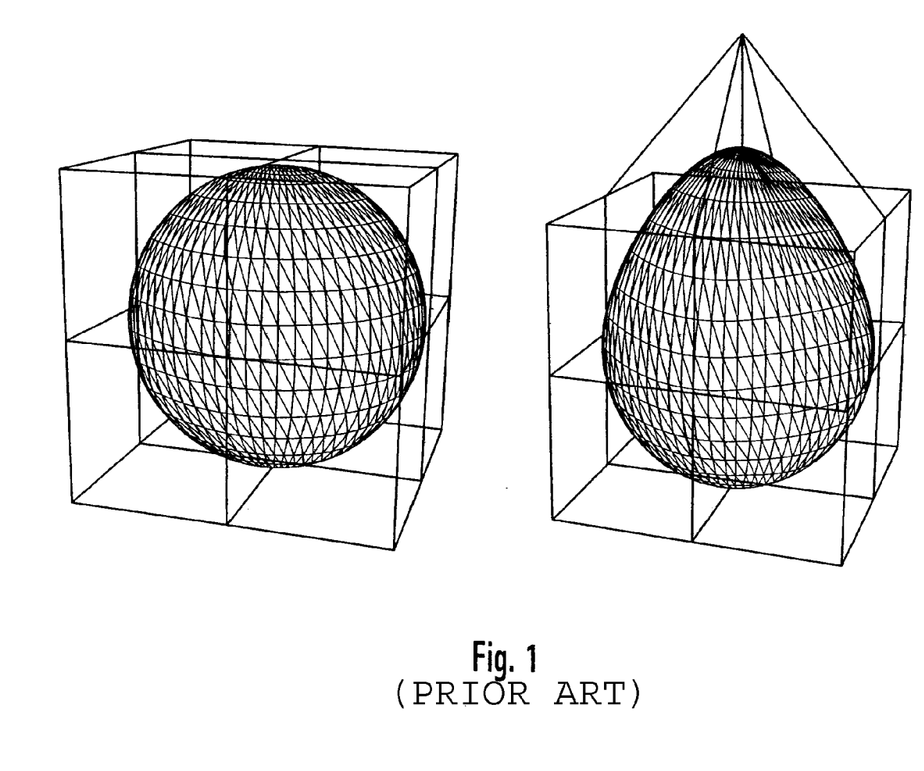
FIG. 1 is a schematic diagram illustrating the basic idea of a conventional free form deformation.

FIG. 1 is a conceptual diagram illustrating the basic idea of the FFD. The sphere of FIG. 1 represents the target object of the optimization. The target object is embedded in a lattice of control points (CP). First, the coordinates of the target object must be mapped to the coordinates in the spline parameter space, according to a procedure known as 'freezing.' If the object is a surface point cloud of the design or a mesh that originates from an aerodynamic computer simulation, each grid point must be converted into spline parameter space to allow the deformations. To perform this calculation, various methods have been proposed including, for example, Newton approximation or similar gradient based methods.

After freezing, the object can be modified by moving a CP to a new position. The new CP positions are the inputs for the spline equations based upon which the updated geometry is calculated. Because everything in the control volume is deformed, a grid from computational fluid dynamics that is attached to the shape is also adapted. Hence, the deformation affects not only the shape of the design but also the grid points of the computational mesh needed for the Computational Fluid Dynamics (CFD) evaluations of the proposed designs. The new shape and the corresponding CFD mesh are generated at the same time without the need for an automated or a manual re-meshing procedure. This feature significantly reduces the computational costs and allows a high degree of automation. Thus, by applying FFD the grid point coordinates are changed but the grid structure is kept intact.

One main disadvantage of the FFD method is its sensitivity to the initial placement of the control points. An inappropriate set-up increases the necessary size of the parameter set; and therefore, increases the dimensionality of the search space. One of the reasons for the inappropriate set-up is that the influence of a control point on an object decreases as the distance from the object increases. Even a small object variation requires a large modification of the control point if the initial distance between the object and the control point is large (this also violates the strong causality condition that is particularly important for Evolution Strategies). The large modification of the control point in turn often modifies other areas of the design space that has to be compensated for by moving other control points. Hence, correlated mutations of control points are often necessary for a local change of the object geometry.

To reduce the effect of the initial positions of the control points, direct manipulation is introduced as a representation that allows determination of variations directly from the shape. Therefore, local deformations of the object depend only on the so-called object points.

Direct manipulation of the free form deformations (DFFD) is an extension of the standard FFD. Instead of moving control points (CP) having effect on the shape that is not always intuitive, the designer is encouraged to modify the shape directly by specifying so-called object points (OP).

Although the initial setup of the control volume in the DFFD is similar to the FFD, the control volume becomes invisible to the user and correlated modifications are calculated analytically. In a first step, the lattice of control points is constructed and the coordinates of the object and the CFD mesh are frozen. The control volume, however, can be arbitrary. That is, the number and positions of control points do not need to have any logical relationship to the embedded object other than the fact that the number of control points determines the degree of freedom for the modification. In the next step, the designer specifies object points, which define handles to the represented object that can be repositioned. The shape is modified by directly changing the positions of these object points. The control points are determined analytically so that the shape variations (introduced by the object point variations) are realized by the deformations associated with the new control point positions. In other words, the control points are calculated in such a way that the object points meet the given new positions under the constraint of minimal movement of the control points in a least square sense. Of course the object variations must be realizable by the deformations from the newly calculated positions of the control point. That is, if the number of control points is too small, some variations given by the new position of the object may not be represented by a deformation.

Figure 2:
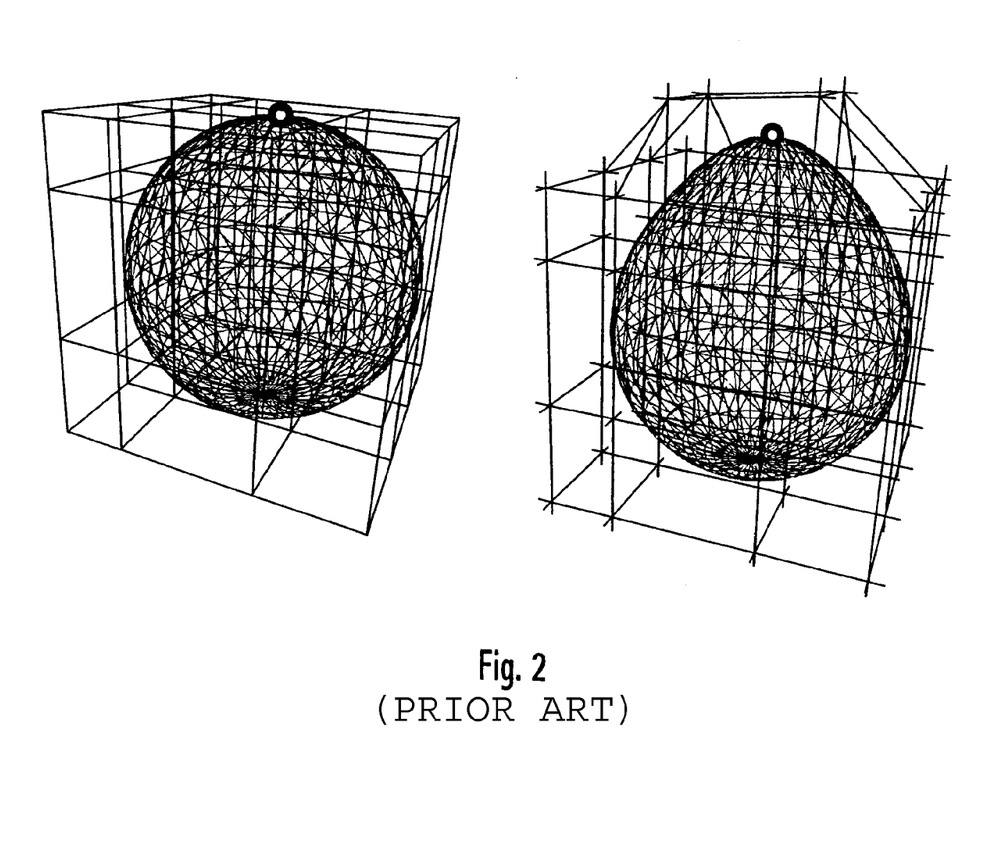
FIG. 2 is a diagram illustrating a conventional Free Form Deformation of a sphere using direct manipulation.

FIG. 2 illustrates an object point at the top of the sphere. The designer is able to move this object point upward without any knowledge of the "underlying" control volume that may be initialized arbitrarily. The direct manipulation algorithm calculates the corresponding positions of the control points to mimic the targeted object point movement. The solution is shown in FIG. 2. The object point is chosen directly from the surface and the required movements of the control points to realize the target movement of the object point are calculated, for example, by the least squares method. The dotted control volume is invisible to the designer because the designer works directly on the object points, and the control volume may be chosen arbitrarily.

The DFFD has several advantages over the standard FFD when combined with evolutionary optimization. The construction of the control volume, and the number and distribution of control points in the DDFD are not as important as in the standard FFD. Furthermore, the number of optimization parameters equals the number of object points.

There are mainly two typical issues with the FFD. First, using the FFD, it is only possible to deform a design given initially. That is, the possible shape modifications are limited by the design which was initially chosen for deformation. Conceptual or structural changes are very difficult to achieve. For example, introduction of holes or edges is either impossible or requires a huge amount of modification to the control points.

Additionally, this process is very difficult and even impossible when dealing with designs that are not allowed to include holes in the represented space. This problem occurs when the FFD is used for deforming systems that are analyzed with computational calculation methods such as Computational Fluid Dynamics (CFD) or Finite Element Methods (FEM) to calculate specific features of the design. For example, if CFD is applied, a computational grid must be built according to the given geometry. If a hole must be introduced in the design, the hole must be meshed and be interfaced properly to the existing mesh to provide the grid for a CFD simulation. In the standard FFD method, this is not possible without a remeshing procedure that is very time consuming.

As a consequence, changes in the design are desired which provide structural design changes without holes in the represented space.

Secondly, when the FFD is applied, the design is modified by moving control points and applying the new positions of the control point to update the design. Issues often arise when control points must be moved for a significant distance to reflect a desired design change. Such moving of the control points results in a control point set that is very ill-structured because many control points are quite close to each other. If control points are very close, further design modifications are very difficult to achieve without having loops in the geometry. Therefore, a reorganization of the representation of the control points is strongly needed in order to allow further modifications to the design.

SUMMARY OF THE INVENTION

It is therefore an object of the invention to provide an improved method and system for manipulating a design. In particular, it is an object of the invention to devise an improved method and system to introduce structural changes in a design or to reorganize the representation.

A method for modifying a representation of an object on a computer according to one embodiment of the present invention may comprise the steps of selecting a first sub-design of the object, wherein the first sub-design comprises a first free form deformation geometry and a first free form deformation control volume that is variable and adaptive; choosing a second sub-design, wherein the second sub-design comprises a second free form deformation geometry; and replacing the first geometry with the second geometry.

In a further embodiment according to the present invention, the method may comprise the step of applying the first free form deformation control volume to the second free form deformation geometry.

In another embodiment according to the present invention, the method may further comprise the step of adapting the first control volume such that distance between the first sub-design and the second sub-design decreases. The adaptation of the first control volume may be achieved using an optimization algorithm.

In still another embodiment according to the present invention, the second sub-design also comprises a second free form deformation control volume that is variable and adaptive. The method according to the embodiment of the present invention further comprises the step of replacing the first control volume by the second control volume. The second sub-design may be chosen from a database. The second sub-design may further be chosen by minimizing distance between the first sub-design and the second sub-design. The method may further comprise the step of automatically adapting the second control volume so that the distance between the first sub-design and the second sub-design decreases. Moreover, the adaptation of the second control volume may be achieved using an optimization algorithm.

A method for optimizing an object design on a computer according to one embodiment of the present invention may comprise the steps of encoding the geometry in the chromosome of the initial parent; reproducing the parent to get a number of offspring; mutating the deformations of the offspring; constructing the geometry from the module tag and applying the deformations given in the chromosomes of the offspring to generate the current design; evaluating all designs; selecting the best design according to the given fitness; repeating the previous steps until a module replacement is intended; performing a shape similarity analysis between the current best design and geometries that can be built from the module database; calculating a probability for each geometry according to the shape similarity results for each design; choosing a number of proper design candidates according to their probabilities; optimizing each of the proper design candidate according to the previous steps with the new geometries encoded in the chromosome and the global fitness equation for more than one generations; choosing the best candidate and activating it for the main optimization; and repeating the above steps or terminating the process when a given stop criterion is met.

The methods according to one embodiment of the present invention may be used for the optimization of a real-world object represented by the design. The optimization may comprise optimizing fluid dynamic objectives.

The Free Style Deformation (FSD) according to one embodiment of the present invention introduces a modular concept for design modifications with the FFD. A module is defined as the geometry that is situated in an FFD sub-control volume. The combination of common FFD techniques and replacement of modules provides an efficient and highly flexible representation of complex structures. The design may be defined by a code specifying the sub-control-volumes to be combined, and the deformations of each control point.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

A preferred embodiment of the present invention is now described with reference to the figures where like reference numbers indicate identical or functionally similar elements.

Because the general concepts of the FFD is discussed above in detail, features of the representation that allow the set up of a modular FFD framework according to the embodiments of the present invention are described below.

One of the features relevant for replacing modules is the underlying spline mathematics. The spline mathematics is important for the determination of the parameters in spline parameter space and the deformations.

Figure 3:
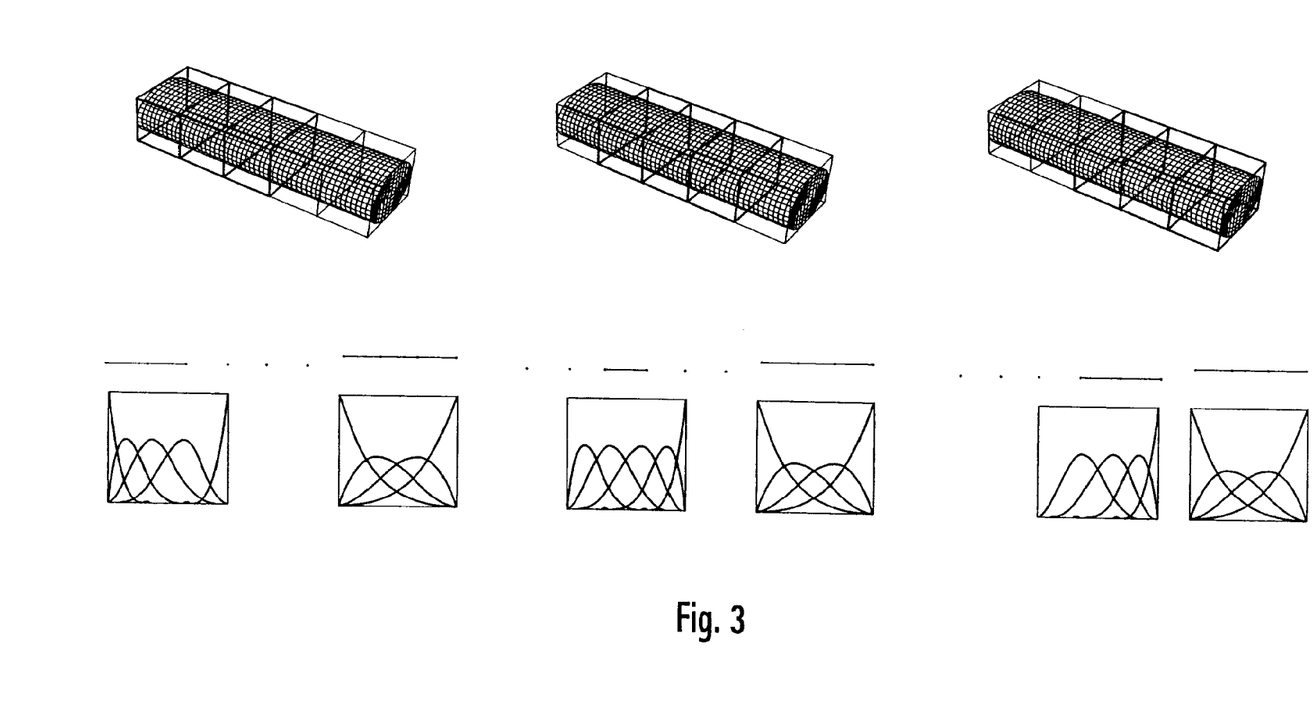
FIG. 3 is a diagram illustrating spline mathematics, according to one embodiment of the present invention.

FIG. 3 is a diagram illustrating the spline mathematics, according to one embodiment of the present invention. For a spline degree of three (3), cubes consisting of 4×4×4 control points are responsible for the calculation of the geometry in the spline parameter space. Each cube is responsible for a small part of the geometry.

Although the method according to the embodiments of the present invention is describe below with reference to the spline degree of three (3), the method may also be applied to other spline degrees in the same manner. The method according to the embodiments of the present invention is also valid for dimensions other than two dimensions. Additionally, although the method according to the embodiments of the present invention is described with reference to B-Splines, the method may also be extended to other types of splines such as H-Splines and T-Splines.

Because the B-splines for a spline degree of three (3) in a lattice of control points can be subdivided into smaller 4×4 squares (in three dimensions a 4×4×4 cubes), each one is responsible for the mathematics of a smaller part of the whole system. This 'local' feature allows the replacing of one (or more) of these squares (cubes) as long as the interfaces are retained. Because every sub-control volume is responsible for the modifications of only a part of the geometry, replacing of such a sub-control volume affects only the geometry within that sub-control volume. The affected geometry is identified by the frozen (s, t, u) coordinates in spline parameter space that are assigned to the specified sub-control volume.

Retaining the interfaces refers to two things. Letter A is used to indicate the module to be replaced and letter B is used to indicate the module to be inserted. Retaining the interfaces, on one hand, refers to the relationship that the structure of the sub-control volume of module A and the sub-control volume of module B are the same. That is, the number of control points and the knot vectors of the modules A and B are identical. Such relationship is true for both the usage of clamped and unclamped splines in the sub-control volumes.

Retaining the interfaces, on the other hand, refers to the relationship that the initial boundary coordinates of the part of the geometry of module A and the boundary coordinates of the part of the geometry of module B are the same in order to guarantee smooth geometric transition. The smooth initial geometric transition of both modules A and B will also provide smoothness when these modules are replaced and the deformations are applied.

The first relationship of retaining the interface relates to the workability of the proposed framework whereas the second relationship of retaining the interface relates to a non-obligatory recommendation to produce geometries that do not have any sudden cracks and maintain smoothness.

In the method according to one embodiment of the present invention, one or more of the squares (or cubes) may be replaced. Then, the deformations of the new modules may be applied to achieve real structural flexibility.

This feature enables the designer to replace one or more of the sub-control volumes and directly apply given deformations to the reconstructed design containing the new modules. The only constraint is that the local structure of the control volume must be the same for all modules.

Figure 4:
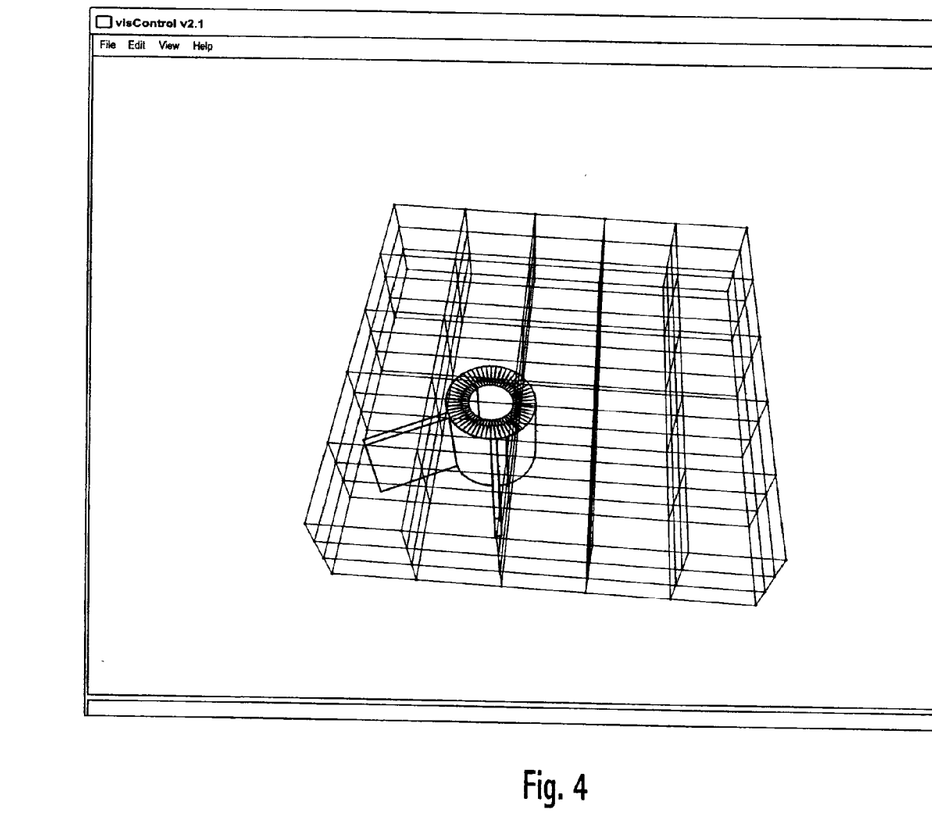
FIG. 4 is a diagram illustrating the preparation of a cylinder, according to one embodiment of the present invention

FIG. 4 is a diagram illustrating the preparation of a cylinder, according to one embodiment of the present invention. To achieve the module flexibility, it is necessary to build the whole geometries and to calculate their coordinates in the spline parameter space. Therefore, the whole geometry is embedded in the control volume initially, which is adapted to the geometry. In the present case, a 6×6×4 control volume is chosen for the sake of simplicity.

Figure 5:
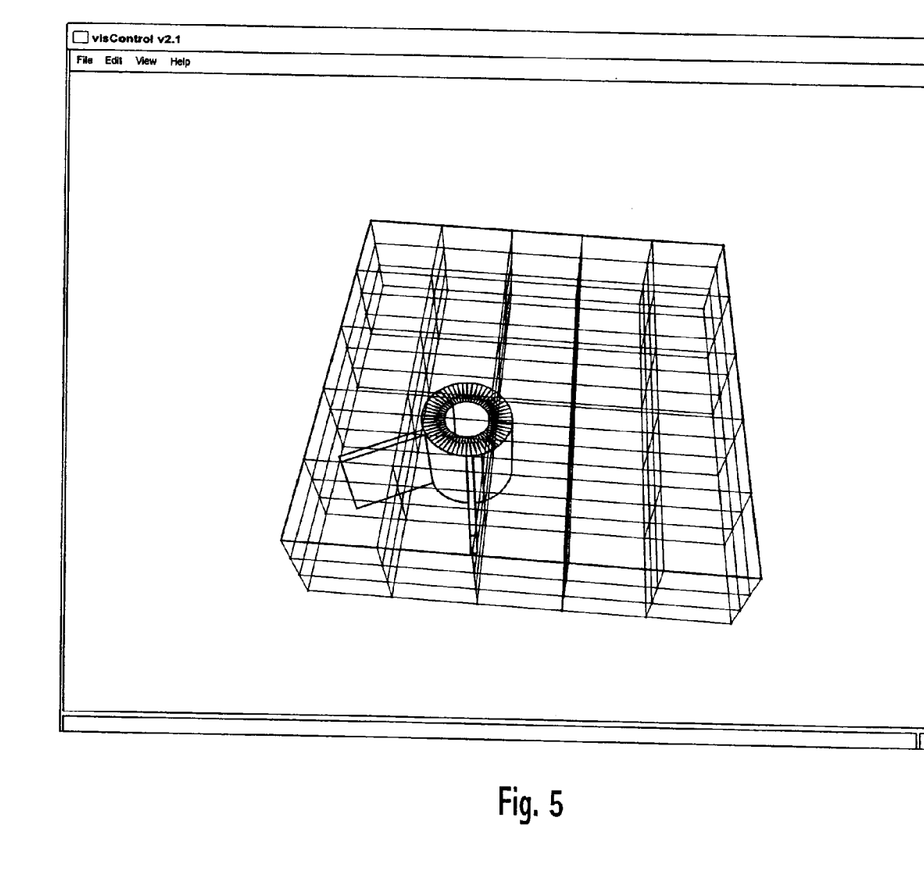
FIG. 5 is a diagram illustrating the overall control volume, according to one embodiment of the present invention.

FIG. 5 is a diagram illustrating the overall control volume, according to one embodiment of the present invention. As described above, for the sub-control volumes considered, each sub-control volume is responsible for a smaller part of the geometry during the freezing process.

Figure 6:
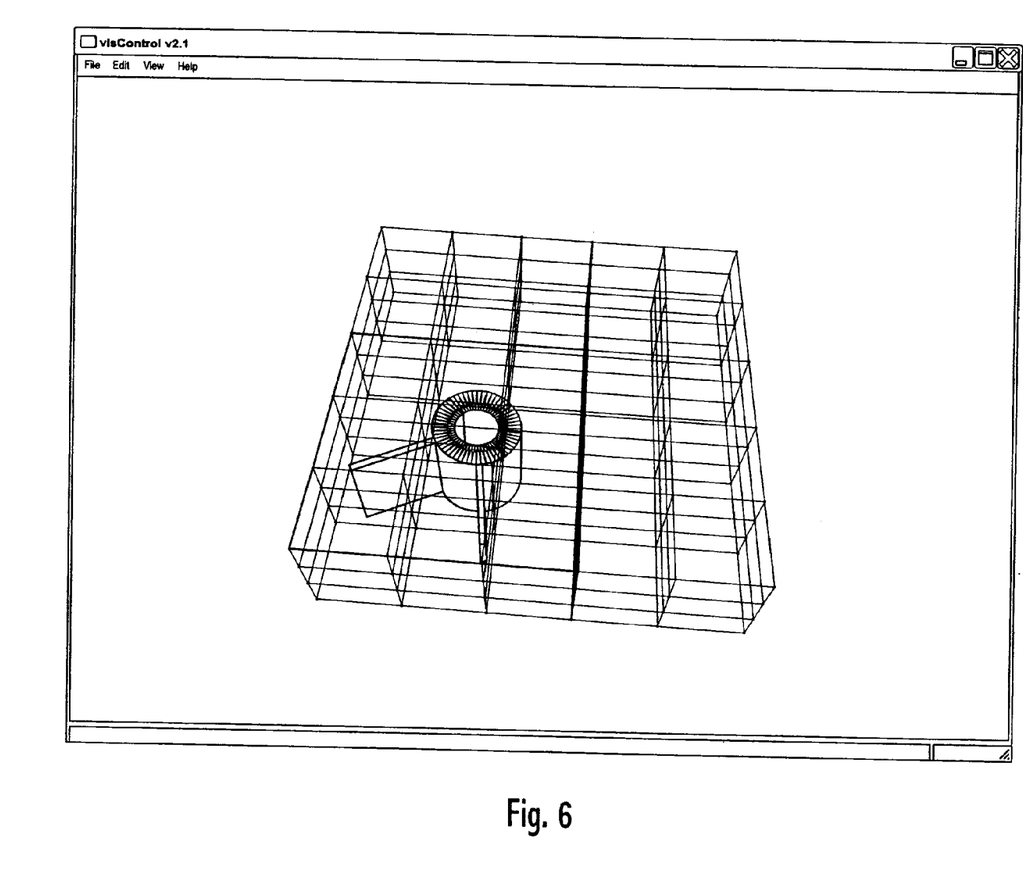
FIG. 6 is a diagram illustrating a 4×4×4 sub-control volume, according to one embodiment of the present invention.

FIG. 6 is a diagram illustrating a 4×4×4 sub-control volume, according to one embodiment of the present invention. The sub-control volume A is responsible for a red region within the spline parameter space (that is, the red region of the geometry is assigned to the sub-control volume A). The grey region of the geometry is frozen by the other sub-control volumes. In FIG. 6, the blue region of the sub-control volume is responsible for the red region of the geometry whereas the other sub-control volumes are responsible for the grey region of the geometry.

This preparation phase must be done for all different modules that may be replaced to form new geometries during the design or optimization process.

Figure 7:
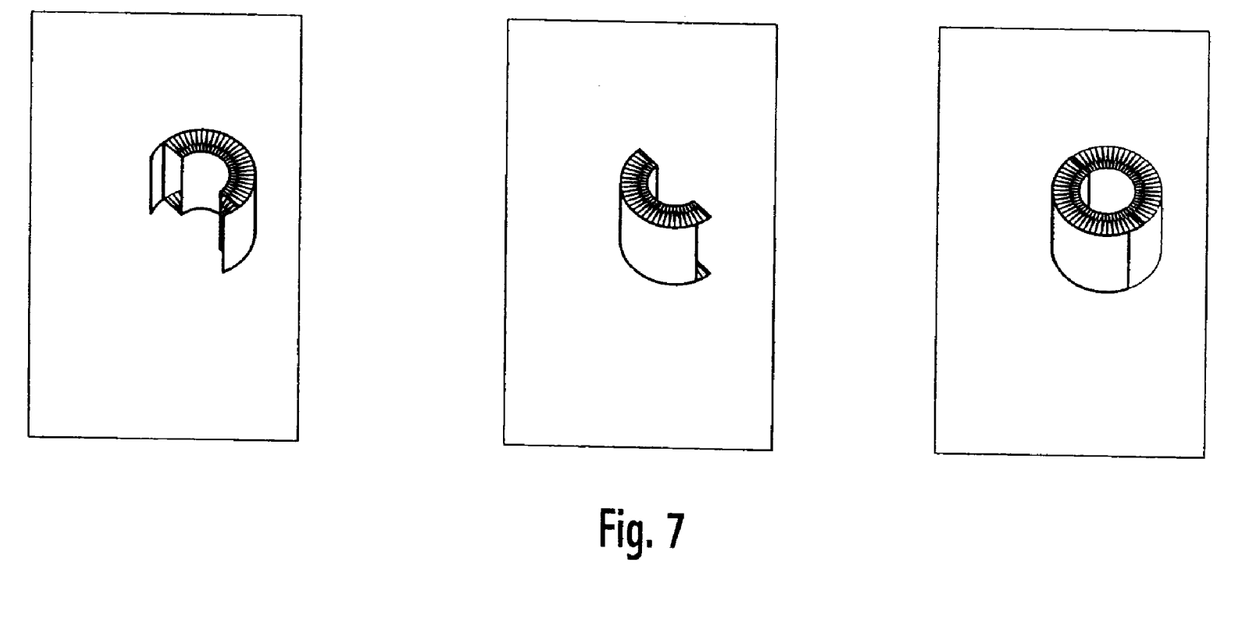
FIG. 7 is a diagram illustrating different types of frozen geometry modules, according to one embodiment of the present invention.

FIG. 7 is a diagram illustrating different types of the geometry modules that is frozen in the way, as described above in detail with respect to the control volume. The modules may be combined with the "base" module (the initial upper part of the cylinder) to produce structurally different kinds of geometries.

In the same way as in the "normal" FFD, the control points may be modified and the deformation may be applied.

Figure 8:
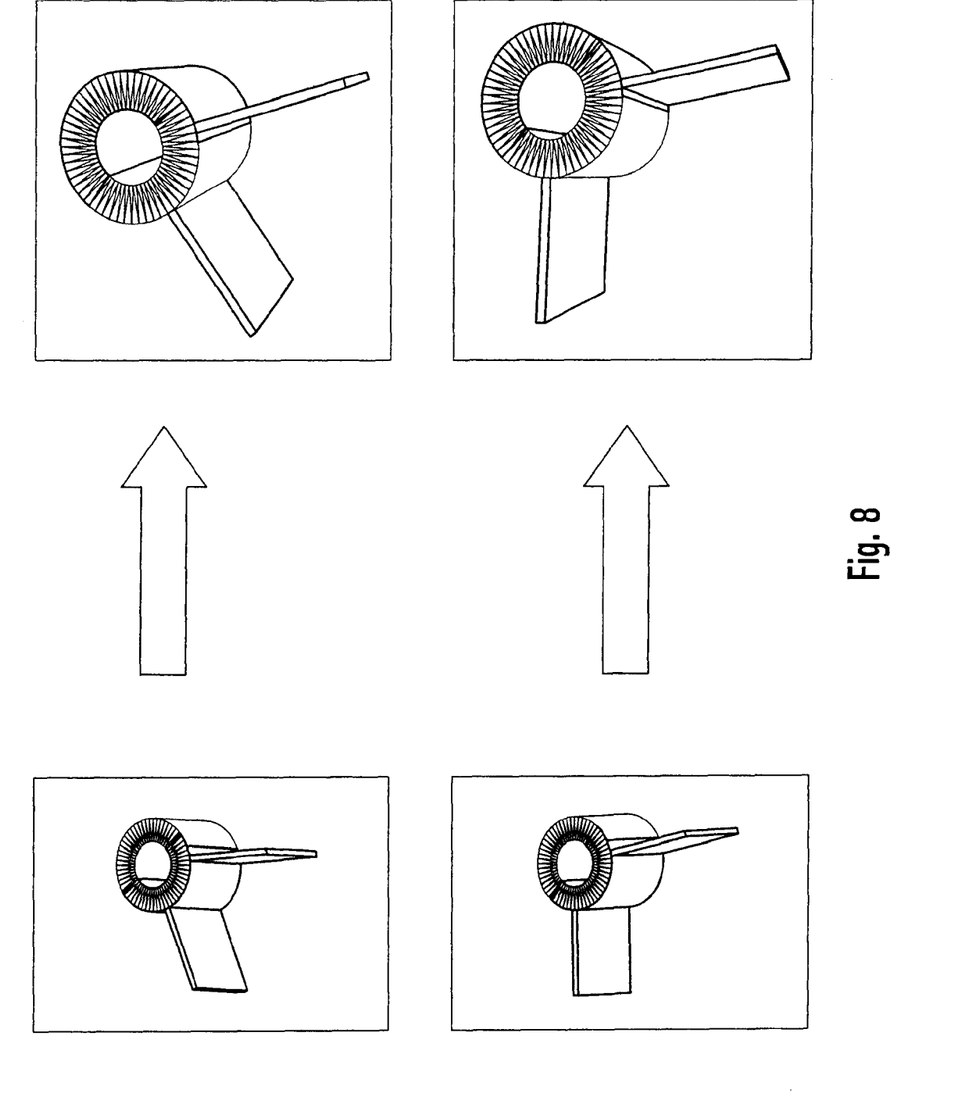
FIG. 8 is a diagram illustrating the deformation of the geometries in FIGS. 3 and 4, according to one embodiment of the present invention.

FIG. 8 is a diagram illustrating the deformation of the geometries in FIGS. 3 and 4, according to one embodiment of the present invention. After construction of the geometry by combining all sub-control volumes, the geometries may be deformed by the same modifications on the control points. In the right pictures of FIG. 8, the grey portion of the geometry is the initial portion and the red marked portion of the geometry is the deformed portion. In addition to this recombination effect, the deformation takes place on the geometry.

In other words, the new proposed method considers both the module replacement and the deformation for a high degree of shape flexibility.

An example framework for working with the FSD is described as follows: First, different geometries are frozen to a control volume and the sub-control volumes respectively (FIGS. 4 to 6). In the next step, an initial geometry is built from a set of modules as the starting point. By the modification of the control points, the geometry is deformed. At some point in time, a desired deformation may not be realized because of the control points that are very densely distributed or because the designer wants to realize a conceptual change. If further deformations need to be performed, a module must be replaced.

This module replacement can be realized in different ways as described in detail below.

I. Replacement of Selected Modules A and B

The modules may be chosen manually. The designer selects module(s) A to be replaced. Then the designer selects module(s) B that is the desired deformation and replacement of the modules.

The modules may be chosen automatically using a computational method. Alternatively, the designer may select module A for replacement and let a computational algorithm decide which module B from a given database is the best choice for replacement. This algorithm can be based on, for example, a shape similarity analysis. The shape similarity analysis attempts to find module B in the database which resembles closest to the current deformed module A and makes recommendation for the replacement.

II. Replacing the Modules and Building the New Assembly

Non-neutral replacement: After modules A and B are determined, module A is replaced with module B. Because the current control point positions are directly applied, the geometry is deformed. Also, because initial module B differs from initial module A, the new geometry is different from the geometry before the module was replaced.

Neutral replacement: After the modules A and B are determined, the module A is replaced with the module B. Because the current control point positions are directly applied, the geometry is deformed. Also, because initial module B differs from the initial module A, the new geometry is different from the geometry before the module was replaced. To "repair" the design so that the geometry after the replacement equals the geometry before the replacement, an optimization may be performed. During this process, the control point positions are optimized in such a way that the design using module B is as close as possible to the design before the replacement using module A.

After the module replacement takes place, the deformation process can be resumed.

The database of geometry modules itself can be extended at any time. Therefore, if an adequate geometry module is not within the database, the part of the geometry to be inserted is designed manually. After this process, the design is embedded in the sub-control volume and is frozen. A big advantage of an existing database is that the mapping from coordinates in Cartesian space to coordinates in parameter space is already done. Therefore, the replacement process is very fast because no freezing needs to be done.

In summary, there are two main features that are achieved by using the Free Style Deformation (FSD)

First is the creative design. After modifying the initial design, two modules are replaced that are chosen manually or by computer software. When the new module is inserted, the already performed deformations are applied to the new module and the new shape is calculated. This design can now be kept for further deformations or the module can again be replaced. It is worth to notice that there is no knowledge on how the new design will appear before the replacement because the deformation takes place immediately and modifies the new module.

Second is the reorganization of the representation. By replacing the module evolved by control point modifications to a similar design that did not undergo any deformations so far, the representation is reorganized because the control points are better distributed. An interesting feature is that the designer does not need to care for the representation. A computational algorithm can select the adequate design and optimize the shape so that it fits as close as possible to the design before the replacement. This will result in a better distribution of the control points, which allows the designer to have more freedom on the design.

In both cases, real structural changes can be achieved because the module replacement can also include the integration of holes or edges in the design.

The following Figures illustrate the module replacement process.

Figure 9:
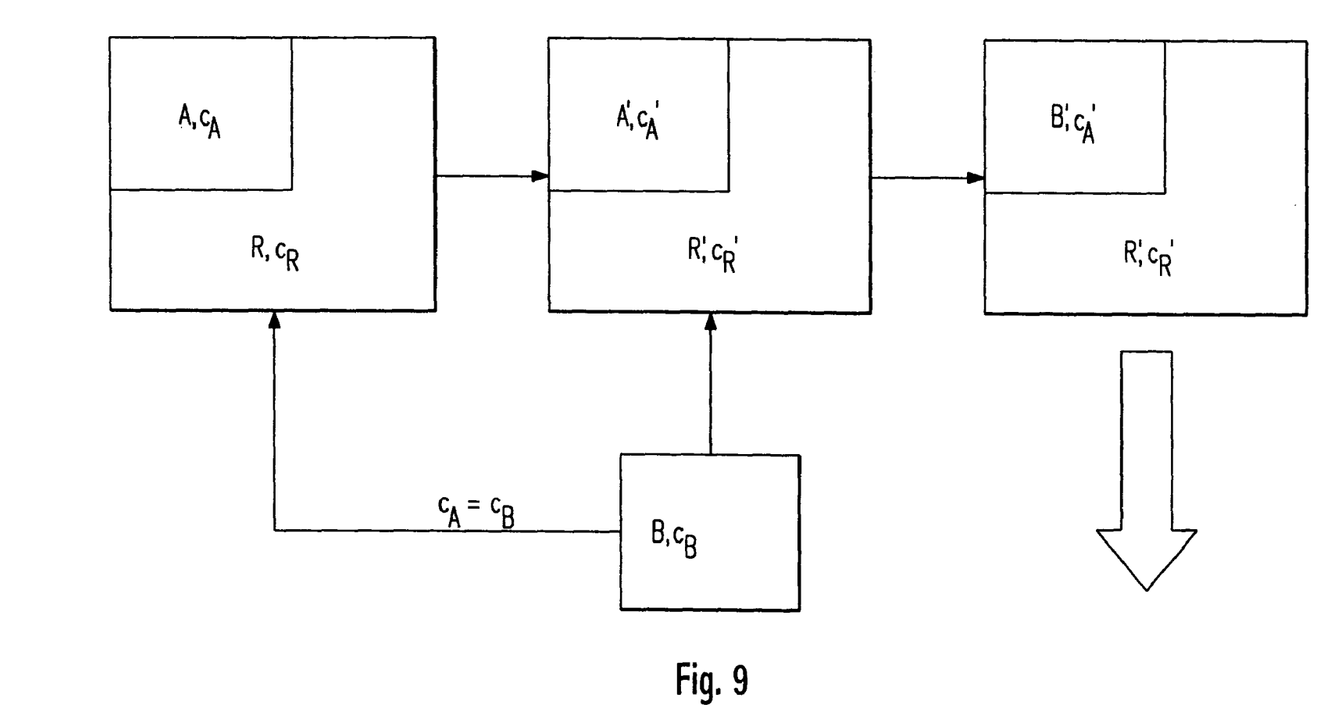
FIG. 9 is a flowchart illustrating the replacement of a module, according to one embodiment of the present invention.

FIG. 9 is a flowchart illustrating the module replacement, according to one embodiment of the invention (Creative Design) in which:

(a) A defines the module to be replaced, $c_A$ refers to the current control point positions assigned to module A;

(b) R defines the remaining geometry, $c_R$ refers to the current control point positions assigned to the geometry R; and (c) the prime symbol (') represents a modified design from its base design. For example, A' is a modified design based on A, and its control points are denoted as $c_A'$.

It is important to note that B'≠B≠A'.

The design built from A and R is deformed to A' and R', $c_A'$ and $c_R'$. Module B is chosen for replacing A'. This design is inserted and the control point positions $c_A'$ are applied to result in a deformed design B'. Advantages of the described method are as follows:

(a) creation of large variations (even a-priori unknown);
(b) unchanged R' after the module replacement;
(c) $c_A'$ are unchanged but search direction is different due to different B'∩R'; and
(d) This helps to escape local minima.

Figure 10:
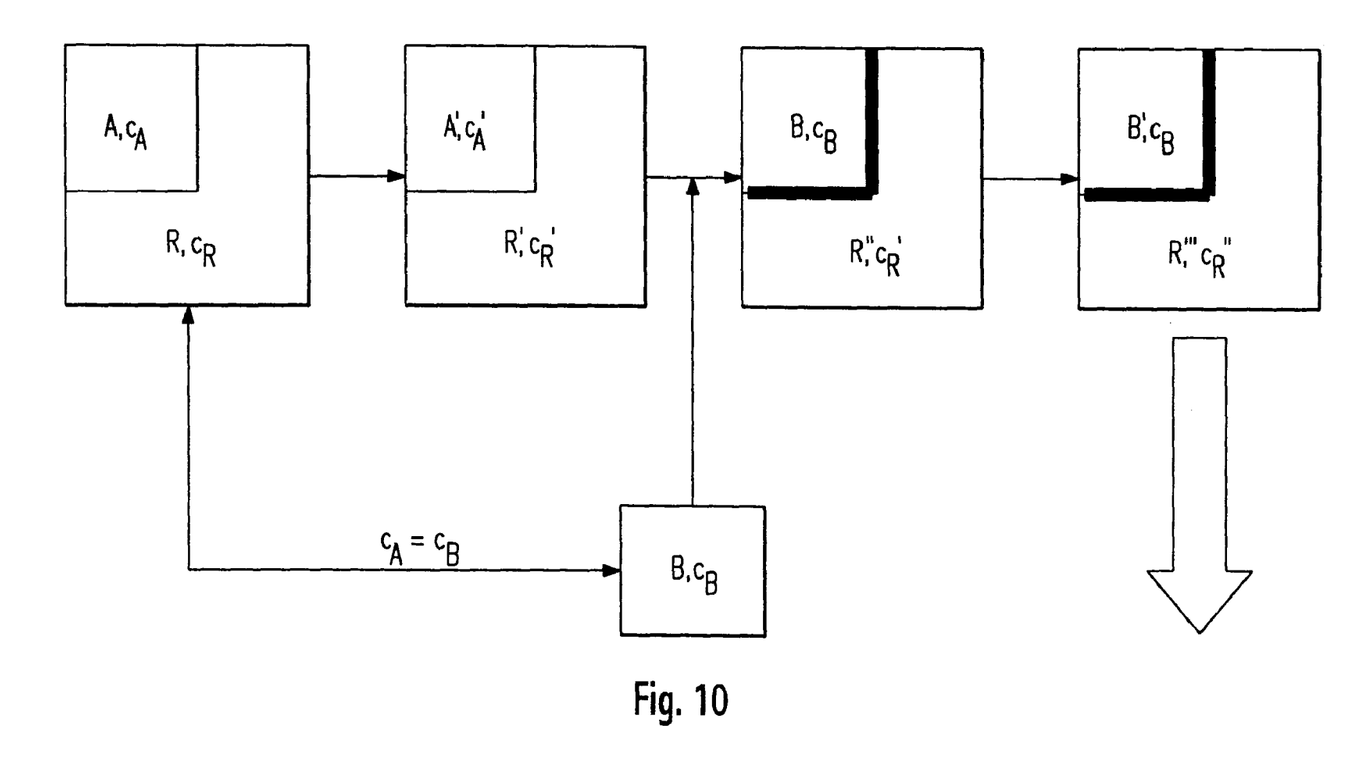
FIG. 10 is a flowchart illustrating the replacement of a module, according to another embodiment of the present invention.

FIG. 10 is a flowchart illustrating the module replacement, according to another embodiment of the invention (Reorganizing the Representation) in which:

(a) A defines the module to be replaced, $c_A$ refers to the current control point positions assigned to module A;

(b) R defines the remaining geometry, $c_R$ refers to the current control point positions assigned to the geometry R; and (c) the prime symbol (') represents a modified design from its base design. That is, A' is a modified design based on A, and its control points are referred to as $c_A'$. Similarly, A" is a modified design based on A'.

The design built from A and R is deformed to A' and R', $c_A'$ and $c_R'$. Module B is chosen for replacing A'. This design is inserted and the control point positions $c_B$ are applied, which results in a non-deformed design B with a different remaining geometry R" because some of the control points of the module B may affect R'. Next a matching may be applied. On one hand, to achieve a neutral insertion, the control points can be optimized in such a way that the geometry built from B∩R" is as close as possible to A'∩R'. This will result in a geometry B'∩R''' defined by the optimized control point positions $c_B'$ and $c_R''$. On the other hand, the matching process can be driven by only a partial match so that the geometry defined in A' is a part of the geometry defined in B.

The advantages of the described method are: (a) $c_B'$ are better organized as $c_A'$ and allow more flexibility on the design; (b) This helps avoid local minima when the FSD is applied in optimizations; (c) This helps open up new directions for manual creative design; and (d) if the matching is applied B'∩R''' are close to A'∩R' but the control points are better distributed.

In another embodiment, the proposed method of the FSD may be extended by direct manipulation. The only difference is in the handles. In the standard FSD framework, the deformation is applied via the control points. In a direct manipulation framework, the deformations are done by modifying object points. These object points can be predefined on each geometry module or they can be defined after a module replacement. Because the control points are updated by computational algorithm, the distribution and choice of object points depends solely on the designer.

In summary, the FSD is a very flexible representation which combines the features of the standard FSD and the concept of modular geometries. The advantages are the efficient modelling of deformations of geometry instead of the geometry itself, which is especially important for complex designs as well as allowing conceptual and structural design changes by the replacement of sub-control volumes.

In another embodiment of the invention, the techniques of the FSD may be combined with an optimizer to solve design optimization problems in engineering, for example, in the construction of a turbine wing or an aircraft.

When combining the standard FSD with optimization, some important steps must be taken. First, the initial optimized design must be represented by the FSD. Therefore, an adequate control volume must be set up in which the geometry is embedded. Additionally, all modules available for the optimization must be embedded in the FSD control volume and their coordinates must be transferred to the parameter space. All modules will be collected in a database.

Two types of information have to be managed as optimization parameters: (a) a unique tag that defines which modules are currently active (i.e., which modules build the design); and (b) the deformations of the control points.

During optimization, both parameters are varied. Therefore, the tag for the active module combination may change as well as the deformations. There are several types of optimization algorithms available for optimization, one of the algorithms being an evolutionary algorithm.

Using the evolutionary algorithms, the deformations and the tag for the active modules are encoded in the chromosome of the initial parent. There are a lot of possibilities to perform the optimization. For example, the parent can be reproduced and slightly modified according to the chosen strategy. On one hand, the deformations can be varied, and on the other hand, the tag for the active modules can be changed. Alternatively, several generations can first be calculated only to modify the deformations of the control points and then perform a module change. This allows at first to optimize the geometry based only on deformations to globally adapt the geometry. By tuning the geometry module replacements, the performance can be enhanced because a new module can be closer to the optimum and the control points are reorganized so that more flexibility is achieved. There are a lot of different ways to provide a proper module. For example, the choice can be done based on a shape analysis. By using a shape analysis, the current geometry is compared to geometries which can be built from the existing modules. The geometry that best matches the current geometry can be chosen as active for further optimization. Usually this results in a better organized control volume.

But there are various ways to choose the new module, and therefore, an intelligent strategy is required to make the choice. There are two extremes: the closest shape suggested by the shape similarity analysis to provide a smooth fitness transition after the new modules are activated can be chosen. The disadvantage is the possibility of getting stuck in a local optimum. Alternatively, a more dissimilar module which leads to a step in the fitness curve but can overcome a local optimum is chosen.

A possible solution is to apply the concept of subpopulations that assists in the choice of a proper module but retains the disadvantage of a high computation requirement.

Figure 11:
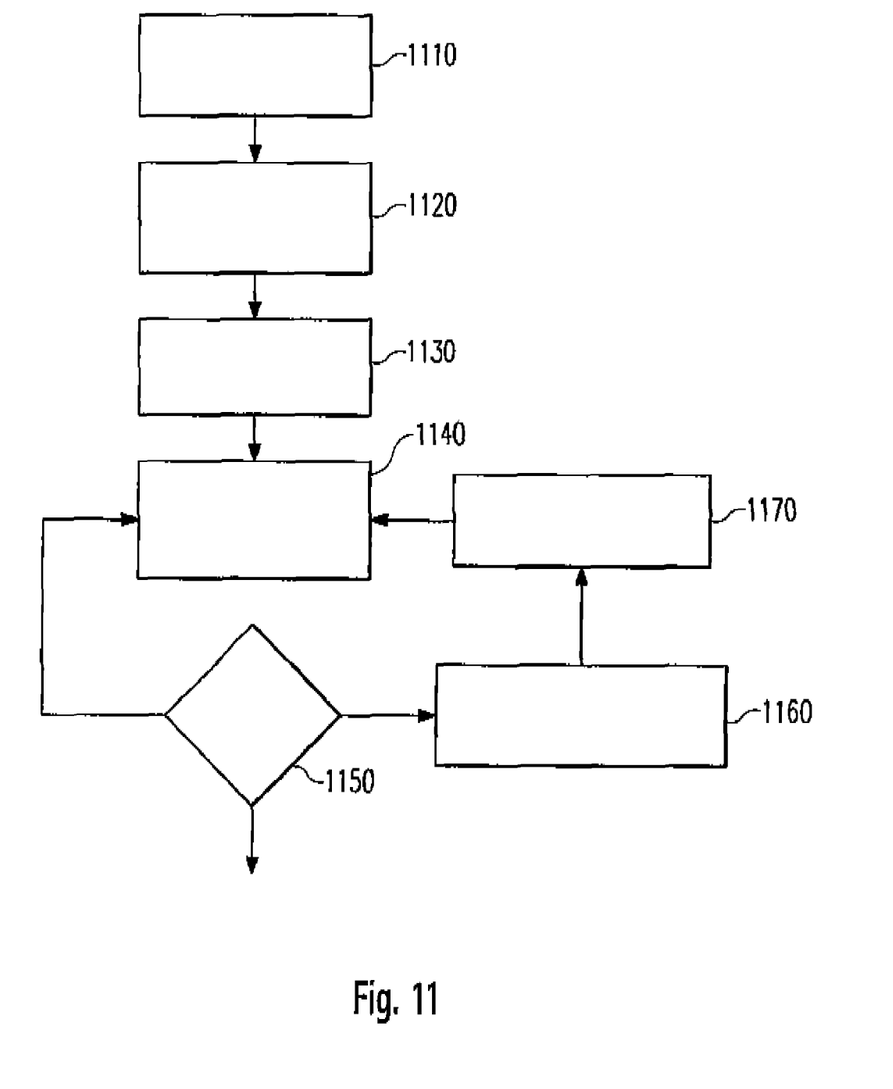
FIG. 11 is a flowchart illustrating a method of optimizing a design using the free style deformation, according to one embodiment of the present invention.

FIG. 11 is a flowchart illustrating a method for optimizing a design using the FSD.

In step 1110, the geometry is embedded in an adequate control volume and the sub-control volumes are determined.

In step 1120, the modular geometries are embedded in the sub-control volumes and a shape database is built. Alternatively, an already present shape database may be used.

In step 1130, the tags for active modules and the control points are encoded.

In step 1140, the control points are optimized according to a given fitness function for a given number of steps. The optimization may comprise the sub-steps of varying the control points, calculating the deformed geometry, and evaluating its performance.

In step 1150, it is determined whether an intermediate step for replacing a module should be effected or not, for example, when the fitness function is a non-desirable value. If this is not the case, step 1140 is repeated. In other words, the main optimization loop (steps 1130 to 1150) comprises the following steps:

(a) Encoding of the geometry in the chromosome of the initial parent (the tag for the active module and the deformations are stored).

(b) Reproduction of the parent to get a number of offsprings.

(c) Mutation of the deformations of the offsprings.

(d) Construct the geometry from the module tag and apply the deformations given in the chromosomes of the offsprings to generate the current design.

(e) Evaluation of all designs.

(f) Selection of the best design according to the given fitness.

(g) Repeat steps (a) to (f) until a module replacement is intended

If a module replacement is intended, then the method continues with step 1160 by performing a shape similarity analysis. Then the module is replaced according to the above-described methods in step 1170.

In other words, the intermediate step for the module replacement may comprise the following steps:

(a) Perform a shape similarity analysis between the current best design and geometries which can be built from the module database.

(b) Calculation of a probability for each geometry according to the result of the shape similarity analysis for each design.

(c) Choice of a number of proper design candidates according to their probabilities In one embodiment of the invention, Target Matching, i.e. an optimization according to the steps 1130 to 1150 with the new geometry encoded in the chromosome of the initial parent may be affected. The fitness is determined by minimizing the difference between the shape built from the new modules and the current best shape that resulted in step 1150. If this optimization is performed, the step in the fitness curve is minimized. This intermediate optimization step optimizes each of the proper design candidates according to the steps 1130 to 1150 with the new geometries encoded in the chromosome and the global fitness equation for several generations.

After performing step 1170, the method branches to step 1140 where the best candidate is chosen and activated for the main optimization. The whole loop may be terminated by a given criterion.

Additionally it may be noted that it is also possible to integrate new modules during optimization. For example, if the optimizer suggests large deformations and no module exists that is close to the deformed geometry, the designer can construct this module and integrate it in the database easily.

The combination of the FSD with optimization has the advantage that the FFD representation provides a good trade-off between the number of parameters and flexibility. This good combination is extended by the concept of replacing modules which allows reorganization of the representation during optimization and real structural changes in the design.

The FSD is especially useful when working with the CFD or other computational methods that need a computational grid for design evaluation. If the FFD is applied, the optimization is limited by the choice of the initial design because it is not possible to realize structural changes. For example, the introduction of a hole in the design is difficult to realize because a new CFD mesh has to be constructed in the hole and carefully connected to the existing mesh. The FSD relies on predefined modules that already have a mesh and are well interfaced. This allows a fast replacement of modules.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method of modifying a representation of an object on a computer, the method comprising:
   encoding the object into a representation of the object;
   applying a modular free form deformation control volume to the object representation;
   selecting, at the computer, a first sub-control volume of the modular free form deformation control volume of the object, the first sub-control volume comprising a first free form deformation geometry;
   choosing a second sub-control volume comprising a second free form deformation geometry; and
   replacing the first sub-control volume with the second sub-control volume in the modular free form deformation control volume to modify the representation of the object by using the free form deformation geometry of the second sub-control volume instead of the free form deformation geometry of the first sub-control volume.

2. The method of claim 1, further comprising applying the first free form deformation control volume to the second free form deformation geometry.

3. The method of claim 2, further comprising adapting the first sub-control volume to decrease distance between the first sub-design and the second sub-design.

4. The method of claim 3, wherein adapting the first sub-control volume is achieved using an optimization algorithm.

5. The method of claim 1, wherein the second sub-control volume comprises a second free form deformation control volume that is variable and adaptive, and further comprising replacing the first sub-control volume with the second control volume.

6. The method of claim 5, wherein the second sub-control volume is chosen from a database.

7. The method of claim 6, wherein the second sub-design is chosen by minimizing distance between the first sub-control volume and the second sub-control volume.

8. The method of claim 5, further comprising the step of automatically adapting the second sub-control volume to decrease distance between the first sub-control volume and the second sub-control volume.

9. The method of claim 8, wherein adapting the second sub-control volume is achieved using an optimization algorithm.

10. A method of optimizing an object design on a computer, the method comprising:
    encoding the object into a representation of the object;
    applying a modular free form deformation control volume to the object representation;
    selecting, at the computer, a first sub-control volume of the modular free form deformation control volume of the object, the first sub-control volume comprising a first free form deformation geometry;
    choosing a second sub-control volume comprising a second free form deformation geometry; and
    replacing the first sub-control volume with the second sub-control volume in the modular free form deformation control volume by using the free form deformation geometry of the second sub-control volume instead of the free form deformation geometry of the first sub-control volume.

* * * * *